US010531603B2

(12) United States Patent
Ferrari et al.

(10) Patent No.: US 10,531,603 B2
(45) Date of Patent: Jan. 14, 2020

(54) AGRICULTURAL SYSTEM (71) Applicant: CNH Industrial America LLC, New Holland, PA (US)

(72) Inventors: Luca Ferrari, Formigine (IT); Trevor Stanhope, Darien, IL (US); Kevin Smith, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/590,639

(22) Filed: May 9, 2017

(65) Prior Publication Data
US 2018/0325012 A1    Nov. 15, 2018

(51) Int. Cl.
*G06F 7/70*      (2006.01)
*A01B 69/00*    (2006.01)
*A01B 69/04*    (2006.01)
*G01S 13/94*    (2006.01)
*G05D 1/02*      (2006.01)

(52) U.S. Cl.
CPC .......... *A01B 69/001* (2013.01); *A01B 69/008* (2013.01); *G01S 13/94* (2013.01); *G05D 1/0257* (2013.01)

(58) Field of Classification Search
CPC ..... A01B 69/001; A01B 69/008; G01S 13/94; G05D 1/0257
USPC ............. 701/50; 364/424.01, 424.02, 424.07
See application file for complete search history.

(56) References Cited

U.S. PATENT DOCUMENTS

| | | | | |
|---|---|---|---|---|
| 10,255,670 | B1* | 4/2019 | Wu | G06T 7/0004 |
| 2014/0224377 | A1* | 8/2014 | Bonefas | A01D 43/073 |
| | | | | 141/1 |
| 2015/0245565 | A1* | 9/2015 | Pilgrim | A01G 7/06 |
| | | | | 280/79.2 |
| 2015/0321694 | A1* | 11/2015 | Nelson, Jr. | G06T 7/73 |
| | | | | 382/104 |
| 2016/0019560 | A1* | 1/2016 | Benkert | G06Q 30/0201 |
| | | | | 700/284 |
| 2016/0078611 | A1* | 3/2016 | Butts | G01S 17/89 |
| | | | | 382/110 |
| 2016/0168094 | A1* | 6/2016 | Jaroskova | C07D 207/26 |
| 2016/0249533 | A1* | 9/2016 | Byttebier | A01D 43/087 |
| | | | | 701/50 |
| 2017/0049044 | A1* | 2/2017 | Stoller | A01C 23/025 |
| 2017/0083747 | A1* | 3/2017 | Guan | G06K 9/0063 |
| 2017/0089742 | A1* | 3/2017 | Bruns | A01D 41/1273 |
| 2017/0131718 | A1* | 5/2017 | Matsumura | G05D 1/02 |
| 2017/0199528 | A1* | 7/2017 | Detweiler | G01S 17/89 |
| 2017/0223889 | A1* | 8/2017 | Cavender-Bares | |
| | | | | A01B 69/008 |
| 2017/0235471 | A1* | 8/2017 | Scholer | A01D 41/1277 |
| | | | | 715/772 |
| 2017/0359940 | A1* | 12/2017 | Bassett | A01B 61/044 |
| 2017/0367253 | A1* | 12/2017 | Engel | A01C 7/046 |
| 2018/0024050 | A1* | 1/2018 | Hollstein | A01M 7/0089 |
| | | | | 382/103 |

(Continued)

*Primary Examiner* — Shardul D Patel
(74) *Attorney, Agent, or Firm* — Rickard K. DeMille; Rebecca L. Henkel (57) ABSTRACT

An agricultural system is disclosed comprising one or more radar sensors configured to acquire radar data representative of crop rows in an agricultural field. The system also comprises a controller configured to determine crop-property-data based on the radar data. The crop property data is representative of one or more properties of crop rows that are in a field.

16 Claims, 4 Drawing Sheets

(56) References Cited

U.S. PATENT DOCUMENTS

| | | | |
|---|---|---|---|
| 2018/0168094 A1* | 6/2018 | Koch | G01J 5/04 |
| 2018/0243774 A1* | 8/2018 | Davis | B05B 15/68 |
| 2018/0253600 A1* | 9/2018 | Ganssle | A01G 22/00 |

* cited by examiner

AGRICULTURAL SYSTEM

BACKGROUND OF THE INVENTION

Determining properties of crop rows that are to be processed by an agricultural vehicle, such as a sprayer, can be beneficial for improving the operation of the agricultural vehicle. For example, cross-track error, which can result in the agricultural vehicle damaging the crop rows, can be reduced.

SUMMARY OF THE INVENTION

According to a first aspect of the invention, there is provided a system comprising:

one or more radar-sensors configured to acquire crop-radar-data representative of crop rows in the agricultural field; and a controller configured to determine crop-property-data based on the radar-data, wherein the crop-property-data is representative of one or more properties of crop rows that are in a field.

Advantageously, such radar-sensors can generate radar-data that is better representative of the crop rows than is possible with optical sensors. This can enable an agricultural vehicle to be better controlled, which can result in reduced cross-track error and reduced crop damage The crop-property-data may comprise crop-location-data, which is representative of the location of a crop row, optionally in relation to the agricultural vehicle.

The controller may be configured to determine route-plan-data that is representative of a route to be taken by an agricultural vehicle in the agricultural field, based on the crop-property-data.

The controller may be configured to determine vehicle-control-instructions for an agricultural vehicle, based on the crop-property-data. The vehicle-control-instructions may comprise vehicle-steering-instructions for automatically controlling the direction of travel of the agricultural vehicle.

The crop-property-data may comprise: crop-location-data that is representative of the location of a crop row in relation to the agricultural vehicle; and/or crop-absence-location-data that is representative of the location of an absence of a crop row in relation to the agricultural vehicle. The vehicle-steering-instructions may be for automatically controlling the direction of travel of the agricultural vehicle such that the crop-location-data and/or the crop-absence-location-data tends towards a predetermined value. The predetermined value may be representative of a predetermined location in relation to the agricultural vehicle.

The controller may be configured to: determine a property-confidence-value associated with the crop-property-data, and determine the vehicle-control-instructions also based on the property-confidence-value.

The vehicle-control-instructions may comprise vehicle-speed-instructions for automatically controlling the speed of the agricultural vehicle.

The vehicle-control-instructions may be configured to cause an output-device to provide instructions for an operator of the agricultural vehicle to set a speed and/or direction of travel of the agricultural vehicle.

The system may further comprise an agricultural vehicle that is configured to be operated in accordance with the vehicle-control-instructions.

The controller may be configured to: filter the crop-radar-data by applying one or more filter-coefficient-values to provide filtered-crop-radar-data; set the one or more filter-coefficient-values based on one or more crop-parameters; and determine the crop-property-data based on the filtered crop-radar-data.

The one or more radar-sensors may be configured to acquire field-radar-data representative of one or more objects in, and/or characteristics of, an agricultural field. The controller may be configured to: determine field-property-data based on the field-radar-data; and determine route-plan-data and/or vehicle-control-instructions based on: (i) the crop-property-data and (ii) the field-property-data.

The one or more radar-sensors may be associated with an agricultural vehicle, and may be configured to acquire crop-radar-data that is representative of crop in the agricultural field in the vicinity of the agricultural vehicle.

The system may further comprise the agricultural vehicle. The one or more radar-sensors may be positioned on the agricultural vehicle such that they have a field-of-view that is above a canopy of the crop rows. The one or more radar-sensors are positioned on the agricultural vehicle such that they have a field-of-view that is below a canopy of the crop rows.

The one or more radar-sensors may be selectively positionable on the agricultural vehicle at: (i) a first-radar-position such that they have a first field-of-view that is above a canopy of the crop rows; and (ii) a second-radar-position such that they have a second field-of-view that is below the canopy of the crop rows. The controller may be configured to set the position of the one or more radar-sensors as either the first-radar-position or the second-radar-position based on the crop-property-data. The crop-property-data may be representative of one or both of canopy-cover and crop-maturity.

There may be provided a computer program, which when run on a computer, causes the computer to configure any apparatus, including a controller, processor, machine, vehicle or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples.

The computer program may be provided on a computer readable medium, which may be a physical computer readable medium such as a disc or a memory device, or may be embodied as a transient signal. Such a transient signal may be a network download, including an internet download.

BRIEF DESCRIPTION OF THE DRAWINGS

Embodiments of the present invention will now be described by way of example and with reference to the accompanying drawings in which.

DETAILED DESCRIPTION OF THE DRAWINGS

Figure 1A:
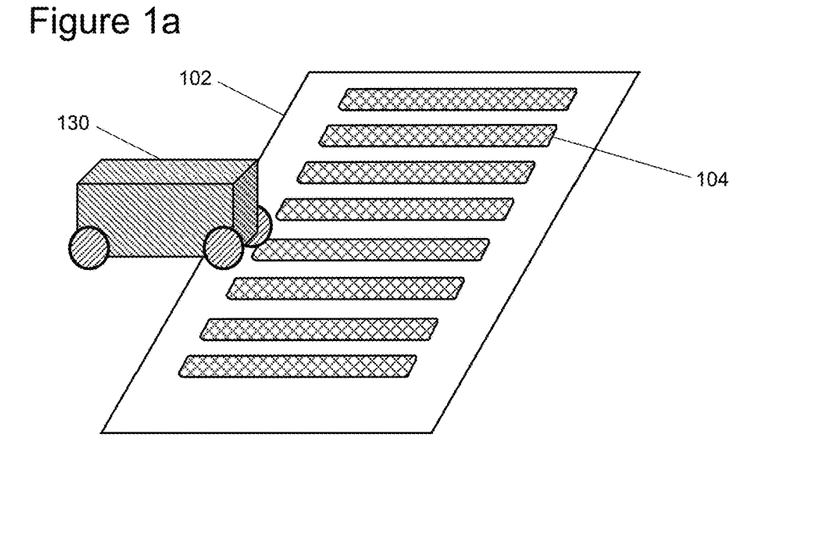
FIG. 1a shows an example of an agricultural field.

FIG. 1a shows schematically an agricultural field 102. The field 102 includes rows of crop material (crop rows)

Figure 1B:
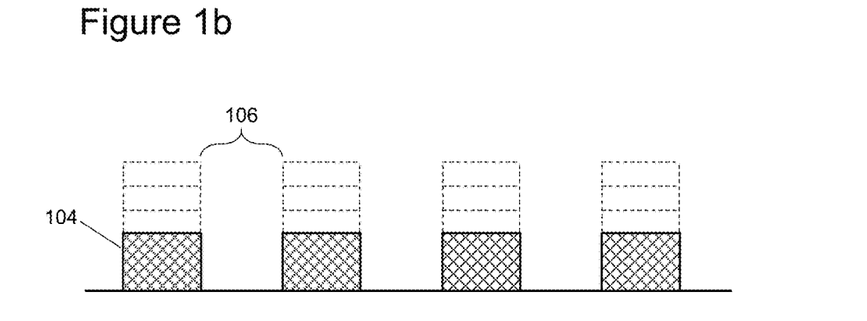
FIG. 1b shows schematically a cross-section of crop rows.

104, which may be standing crop material such as corn. The crop rows 104 are elongate rows of the products in question. Typically, the field 102 contains many, essentially mutually parallel, crop rows 104 standing in a field, as shown in FIGS. 1a and 1b. The crop rows 104 are spaced from one another by largely consistent gaps 106.

Figure 3:
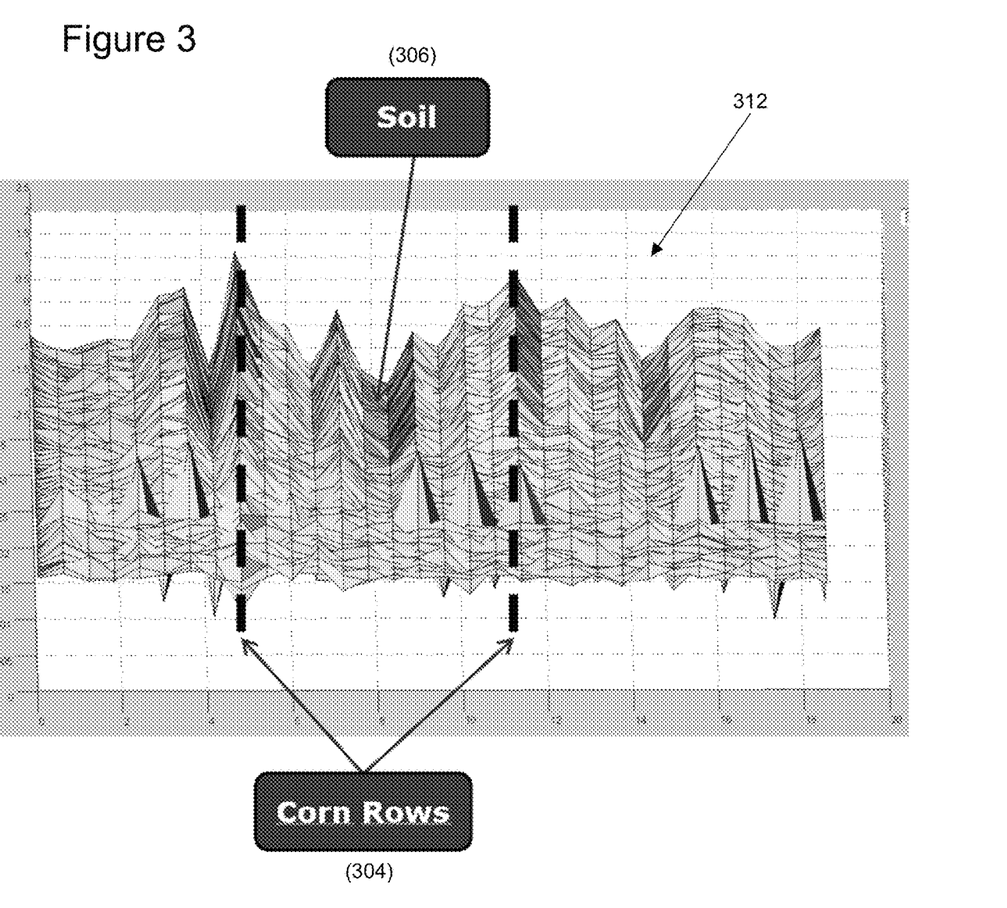
FIG. 3 shows an example of crop-radar-data that can be acquired by a radar-sensor.

An agricultural vehicle 130 can drive through the field 102 to process the crop rows 104, in such a way that the agricultural vehicle 130 contacts the ground in the gaps 106 between the crop rows 104, thereby avoiding damage to the crop rows 104. In one example, the agricultural vehicle 130 is a sprayer, which includes laterally extending booms (as shown in FIG. 3) for spraying a treatment onto the crop rows 104.

FIG. 1b shows schematically a cross-section of crop rows 104. The cross-section is in a plane that is transverse to the longitudinal direction of the elongate crop rows 104, which may also be in a plane that is transverse to a direction of movement of the agricultural vehicle 130 as it processes the crop rows 104. It will be appreciated that the crop in the crop rows 104 will grow during a season, and this is shown schematically in FIG. 1b by the dotted lines that are associated with each crop row 104. Also shown in FIG. 1b are the gaps 106 between the crop rows 104, along which the wheels or tracks of the agricultural vehicle 130 can travel. As the crop grows, a canopy (not shown) can develop over the gaps 106 such that, from above at least, the locations of the crop rows 104 may not be easily visible.

Figure 2:
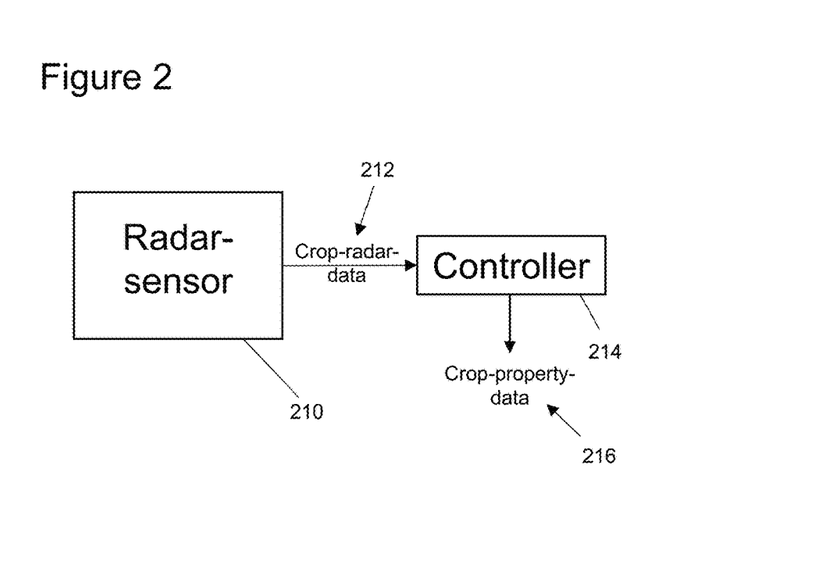
FIG. 2 shows schematically a system that is associated with determining crop-property-data.

FIG. 2 shows schematically a system for determining crop-property-data 216, which is representative of one or more properties of a crop row in a field. The system includes one or more radar-sensors/a radar-system 210 that can acquire crop-radar-data 212 that is representative of crop rows in the agricultural field. As will be discussed in more detail below, the radar-sensor 210 may be mounted on an agricultural vehicle (not shown), and can be operational whilst the agricultural vehicle is processing the crop rows. That is, the radar-sensor 210 may have a field-of-view that encompasses portions of the crop that are to be processed.

The system also includes a controller 214 that can determine the crop-property-data 216 based on the crop-radar-data 212. It will be appreciated that the controller 214 can be located on the agricultural vehicle, or remotely from the agricultural vehicle. For example, the functionality of the controller 214 can be performed on a remote server, such as one "in the cloud".

Advantageously, the radar waves that are generated by the radar-sensor 210 are capable of penetrating a crop canopy that can obscure the true centre of a crop row. Therefore, use of a radar-sensor 210 can be considered beneficial when compared with optical sensor systems. This is because the radar-sensor 210 can use electromagnetic waves with a sufficiently long wavelength, such that there is low enough scattering by the canopy so that the bulk of the crop row can be imaged. In this way, a more accurate determination of the location of the crop row can be determined. The radar-sensor 210 can therefore generate radar-data 212 that is better representative of the crop rows than is possible with optical sensors. In some examples, as will be described below, this can enable the agricultural vehicle to be better controlled, which can result in reduced cross-track error and reduced crop damage.

Also advantageously, the radar-sensor 210 can be used during dark, foggy, or dusty conditions, which may not be possible or convenient with optical systems.

The crop-radar-data 212 can be representative of: (i) a distance to a detected object; and (ii) a direction to that detected object from the radar-sensor 210. The radar-sensor 210 can transmit transmitted-radar-signals, and receive received-radar-signals, that are reflected from an object such as the crop row or the ground/soil. By applying appropriate post-processing algorithms, it can be possible to have information on the distance to the object that is causing the reflections and on the angle of arrival. In this way, the radar-sensor 210 can identify objects that are capable of reflecting the electromagnetic radar waves. Any of the radar-sensors described herein can be two-dimensional or three-dimensional radar-sensors, such that they can provide two-dimensional-radar-data or three-dimensional-radar-data.

The radar-data 212 can be provided as a plurality of coordinates that are representative of the locations from which received-radar-signals have been received. In one example the radar-data 212 can be provided as polar coordinates.

Depending on the type of radar and on the number of receiving antennas, the radar-data can be used by the controller 214 to generate a 3D image of the distribution of crop mass as the crop-property-data 216. For example, if the radar-sensor 210 includes a MIMO radar, then the controller 214 can apply algorithms (such as the known MUSIC (multiple signal classification) algorithm) to determine the polar coordinates $(\rho, \vartheta, \varphi)$ of each object that reflects the electromagnetic radar waves. Then, by knowing the installation location of the radar-sensor 210, the controller 214 can determine the geometrical coordinates (x, y, z) of the identified objects. This is one example of how the controller 214 can determine crop-location-data, which is representative of the location of the crop material.

As will be discussed below, the crop-property-data 216 can also include crop-absence-location-data, which is representative of the locations where the absence of a crop row is identified, optionally in relation to the agricultural vehicle.

FIG. 3 shows an example of crop-radar-data 312 that can be acquired by a three-dimensional-radar-sensor. The crop-radar-data 312 is shown in FIG. 3 as multiple sets of three-dimensional Cartesian coordinates (x, y, z), where each coordinate represents the location from which a received-radar-signal has been reflected. In this way, the crop-radar-data represents a profile that corresponds to the ground 306 and crop 304 that has been imaged by the radar-sensor. Advantageously, as discussed above, the profile may not be representative of the less-dense canopy/outer foliage that does not form the bulk of a crop row, but instead happens to spread into what should be considered as the gaps above the soil between the crop rows. This can be because the transmitted-radar-waves are not as significantly reflected by the canopy/outer foliage, as by the central regions of the crop rows 306. A controller can process the crop-radar-data 312 to identify the locations of the crop rows 304 (crop-location-data), and the location of soil/the ground 306 (crop-absence-location-data) in between the crop rows 304.

The controller can determine the crop-location-data and/or the crop-absence-location-data based on the crop-radar-data 312 in various different ways. For example:
  coordinates in the crop-radar-data 312 that are greater than a height-threshold above an identified ground-plane can be identified crop-location-data;
  line-scanning can be performed to identify crop-location-data;
  spatial clustering can be performed to identify crop-location-data;

edge detection can be performed to identify boundaries between crop-location-data and crop-absence-location-data;

feature detection can be performed to identify crop-location-data and/or crop-absence-location-data.

In some examples, the controller can determine the crop-location-data and/or the crop-absence-location-data such that it is representative of a location in relation to the agricultural vehicle. As will be appreciated from FIG. 4, as described below, this may be location data in relation to a wheel of the agricultural vehicle and/or a lateral centre of the agricultural vehicle, as non-limiting examples.

The crop-property-data may include crop-area-data that is representative of a cross-sectional area of a crop row. The cross-section may be in a direction that is transverse to the longitudinal direction of a crop row, which may also be transverse to a direction of movement of the agricultural vehicle that is to process the crop row. Such a cross-section is shown in FIG. 1b.

The crop-property-data may include crop-width-data that is representative of the lateral width of a crop row. The crop-property-data 216 may include crop-height-data that is representative of the height of a crop row.

The crop-property-data may include crop-centre-data that is representative of the centre of a crop row. The crop-centre-data may be one-dimensional, in that it can be representative of a lateral-centre of the crop (from side-to-side as shown in FIG. 3), or a height-centre of the crop (from top-to-bottom as shown in FIG. 3). Also, the crop-centre-data may be two-dimensional, in that it can be representative of both a lateral-centre of a crop row and a height-centre of the crop row.

The crop-property-data may include crop-extremity-data that is representative of the location of the extremity of a crop row. The crop-extremity-data may be one-dimensional, in that it can be representative of lateral-extremities of the crop row, or a height-extremity of the crop row. Also, the crop-extremity-data may be two-dimensional, in that it can be representative of both lateral-extremities and height-extremities of the crop. The crop-property-data may also include crop-profile-data, which is representative of the perimeter of the crop.

The crop-property-data may include crop-volume-data that is representative of a volume of a crop row.

Returning to FIG. 2, in some examples the controller 214 can filter the crop-radar-data 212 by applying one or more filter-coefficient-values to provide filtered-crop-radar-data (not shown). The controller 214 can set the one or more filter-coefficient-values based on one or more crop-parameters, and determine the crop-property-data 216 based on the filtered crop-radar-data. In some examples, crop-parameters can include crop-maturity, crop-row-spacing, canopy-cover and crop-type. Canopy-cover can be representative of a property of a canopy of the crop rows. For instance the size, thickness, density or location of the canopy. The values of such crop-parameters can be provided as user input in some instances. In this way, the filtering of received-radar-signals can be tuned depending on the kind of plant, the spacing of crop rows, and on the stage of maturity, for example in the early season the plants will be smaller thus necessitating higher radar sensitivity. Therefore, more accurate crop-property-data 216 can be determined.

Figure 4:
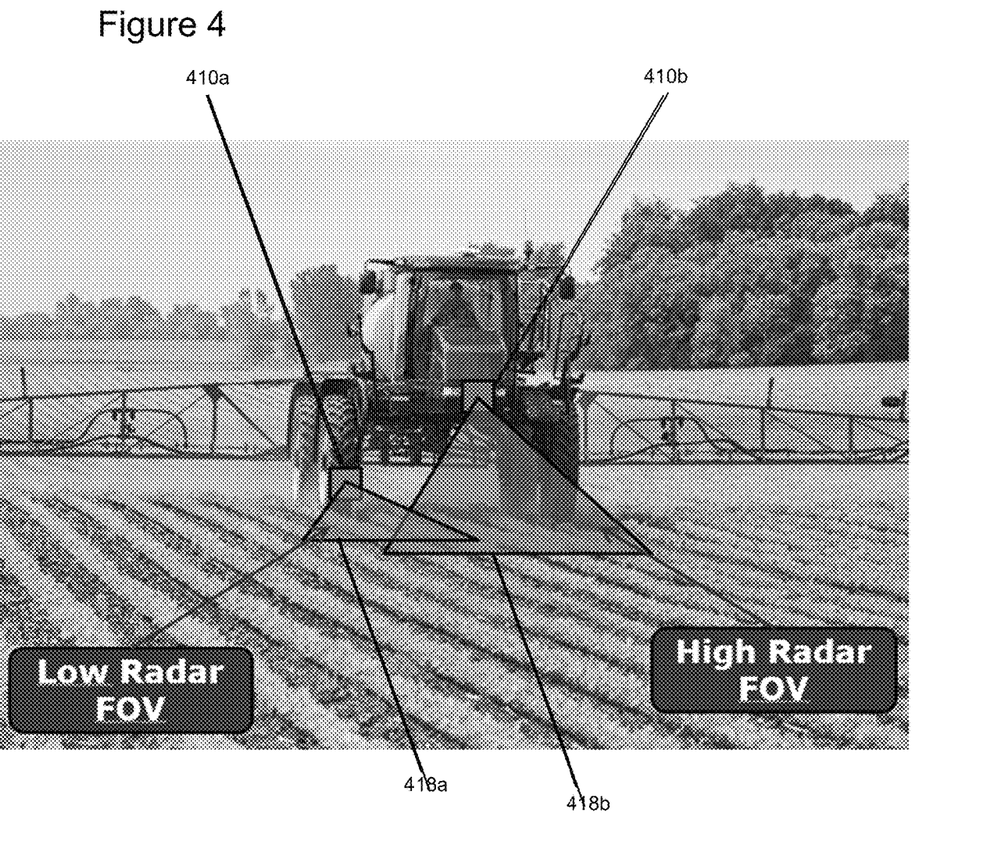
FIG. 4 shows examples of positions where a radar-sensor can be positioned on an agricultural vehicle.

FIG. 4 shows examples of positions where a radar-sensor 410a, 410b can be positioned on an agricultural vehicle. In this example, the agricultural vehicle is a self-propelled sprayer. The sprayer includes laterally extending booms, one on each side of the tractor, for spraying a treatment onto crop rows. In other examples, the agricultural vehicle can be a tractor, combine harvester, cultivator, or nutrient applicator. Any of these vehicles may or may not be self-propelled.

In FIG. 4, a first radar-sensor 410a is located on a lower portion of the agricultural vehicle such that it has a low field-of-view 318a level with or beneath the crop canopy. In this example, the first radar-sensor 410a is aligned with a wheel of the agricultural vehicle with a field-of-view either parallel or transverse to the vehicle direction of travel. A second radar-sensor 410b is also shown in FIG. 4, and is located on an upper portion of the agricultural vehicle such that it has a high field-of-view 418b above the crop canopy. In this example, the second radar-sensor 410b is aligned with the centre of the agricultural vehicle with a field-of-view either parallel or transverse to the vehicle direction of travel. Any system disclosed herein can include one or a plurality of radar-sensors, which can include only one, or both of the radar-sensors 410a, 410b that are shown in FIG. 4.

The radar-sensor can be associated with an agricultural vehicle in any way such that it acquires radar-data that is representative of crop rows in the agricultural field in the vicinity of the agricultural vehicle. As shown in FIG. 4, the radar-sensor 410a, 410b can have a field-of-view 418a, 418b that is in front of the agricultural vehicle (in a direction that is parallel to the direction that the vehicle is moving when it processes the crop), such that the radar-data is representative of a crop row that is in front of the agricultural vehicle. In other examples, the radar-sensor can have a field-of-view that is to the side of the agricultural vehicle (in a direction that is transverse to the direction that the vehicle is moving when it processes the crop), such that the radar-data is representative of crop that is to the side of the agricultural vehicle. Such an example can be used to scan one or more parallel crop rows, that will be subsequently processed by the agricultural vehicle. That is, the crop-property-data may be acquired for a crop row that is different to one that is currently being processed by the agricultural vehicle. This can allow planning and future control operations to be determined in advance of the agricultural vehicle processing a parallel crop row. In further still examples, the radar-sensor can have a field-of-view that is behind the agricultural vehicle.

The one or more radar-sensors can be selectively positionable on the agricultural vehicle at: (i) a first-radar-position such that they have a first field-of-view that is above a canopy of the crop rows; or (ii) a second-radar-position such that they have a second field-of-view that is below the canopy of the crop rows. The first-radar-position can be on a tractor frame or boom to view above the canopy. In some examples, a controller can set the position of the one or more radar-sensors as either the first-radar-position or the second-radar-position based on crop-property-data, such as canopy-cover and crop-maturity, for instance.

In examples where the field-of-view is to the side of the agricultural vehicle, the system can detect crop-property-data for the crop rows next to the one that is currently in front of the agricultural vehicle. This crop-property-data can be used for updating associated information on a map, and can be integrated with GPS coordinates that are already stored for the location of the adjacent crop rows. As will be discussed below, this can involve updating route-plan-data. In this way, when the sprayer will be in the next row, this information can be used to improve the performances of the system/a vehicle guidance algorithm.

In some examples, the radar-sensor can be located on another vehicle (not shown), which is different to the agricultural vehicle that is to process the crop rows, yet still can be considered to be associated with the agricultural vehicle, for example because the other vehicle can be controlled such that it takes a route that is associated with the agricultural vehicle, or is otherwise positioned with reference to the agricultural vehicle. The other vehicle can be a manned or an unmanned vehicle, and may be a land or an aerial vehicle (an unmanned aerial can be referred to as a drone). Use of an aerial vehicle can enable crop-radar-data to be acquired from a radar-sensor at a relatively high altitude to obtain an overview of the field, thereby providing a wide field-of-view. Subsequently or alternatively, the aerial vehicle can stay with the agricultural vehicle at a lower altitude. For example, by flying above or ahead of the agricultural vehicle. The gathered radar-data can be streamed to the controller and/or "the cloud".

Figure 5:
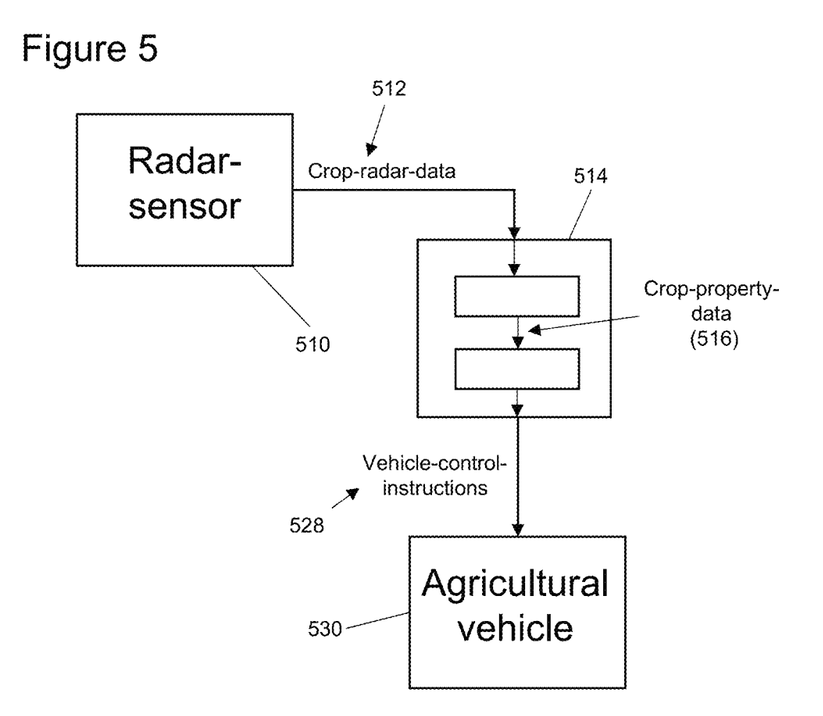
FIG. 5 shows schematically a system that can determine vehicle-control-instructions for an agricultural vehicle based on crop-property-data.

FIG. 5 shows schematically a system that can determine vehicle-control-instructions 528 for an agricultural vehicle 530 based on crop-property-data 516.

The system includes a radar-sensor 510, which can be any radar-sensor described herein. The radar-sensor 510 provides crop-radar-data 512 to a controller 514. The controller 514 processes the crop-radar-data 512 and determines crop-property-data 516, which can be any type of crop-property-data 516 described herein. The controller 514 also processes the crop-property-data 516 in order to determine vehicle-control-instructions 528 for the agricultural vehicle 530.

The vehicle-control-instructions 528 can include vehicle-steering-instructions for automatically controlling the direction of travel of the agricultural vehicle 530. In this way, the controller 514 can determine if the wheels of the agricultural vehicle 530 are not centralised on a gap between crop rows (for example by identifying an offset between (i) the lateral centre of a gap, as defined by crop-absence-location-data for example, and (ii) the lateral centre of a wheel of the agricultural vehicle 530), then the controller 514 can provide vehicle-control-instructions 528 that cause the steering of the agricultural vehicle 530 to be adjusted in order to centralise the wheels of the agricultural vehicle 530 with reference to the gap between crop rows (for example to reduce the offset).

In some examples, the crop-property-data 516 can include crop-location-data and/or crop-absence-location-data. The controller 514 can determine vehicle-steering-instructions 528 for automatically controlling the direction of travel of the agricultural vehicle 530 such that the crop-location-data and/or crop-absence-location-data tends towards a predetermined value. For example, the predetermined value can be representative of a predetermined location in relation to the agricultural vehicle, at which the crop row is expected to be if the agricultural vehicle 530 is correctly aligned with the crop rows. For instance, the predetermined location can be the lateral centre of the agricultural vehicle, or can be aligned with a wheel of the agricultural vehicle.

In some examples, the controller 514 can determine the predetermined location in relation to the agricultural vehicle and/or the offset, by utilising a known relationship between the field-of-view of the radar-sensor 510 and an installation location of the radar-sensor on the agricultural vehicle 530. For instance, the lateral centre of the field-of-view of the radar-sensor 510 may correspond with: the lateral centre of the agricultural vehicle 530 (as represented by the second radar-sensor 410b in FIG. 4); or the lateral centre of a wheel of the agricultural vehicle 530 (as represented by the first radar-sensor 410a in FIG. 4).

In this way, the agricultural vehicle 530 can be autonomously controlled such that it processes crop in an improved way, for example a way that results in reduced cross-track error. That is, vehicle guidance can be provided by processing the crop-radar-data 512 to determine crop-property-data 516, which is then used to determine vehicle-control-instructions 528.

The vehicle-control-instructions 528 can also or alternatively include vehicle-speed-instructions for automatically controlling the speed of the agricultural vehicle 530. For instance, the controller 514 can determine crop-area-data or crop-volume-data (as the crop-property-data 516) and provide vehicle-speed-instructions based on the crop-area-data or crop-volume-data. In one example, the controller 514 can provide vehicle-speed-instructions for automatically increasing the speed of the agricultural vehicle 530 when the crop-radar-data 512 is representative of a decreasing value for the crop-area-data or crop-volume-data, and vice versa. In some examples, the controller 514 can apply an algorithm to the crop-area-data or crop-volume-data in order to determine the vehicle-speed-instructions. In other examples, the controller 514 can use a database or look-up-table to determine the vehicle-speed-instructions based on the crop-area-data or crop-volume-data.

In some examples the vehicle-control-instructions 528 can cause an output-device (such as a display or audio device in the cab of the agricultural vehicle 530) to provide instructions for an operator of the agricultural vehicle 530 to set a speed and/or direction of travel of the agricultural vehicle 530. Optionally, a raw radar image and/or cluster tracking data can be provided by the controller 514, and may be displayed on a suitable output-device.

A guidance system for an agricultural vehicle 530 may utilise (optionally straight) AB lines that are set based on the expected location of the crop rows, or may import guidance maps to a GPS navigation system from previous field operations. This can be expected to achieve accurate row guidance. However, such guidance systems can be suboptimal in numerous scenarios, including non-straight rows, GPS drift, implement drift (for example, because the agricultural vehicle is on sloped terrain), or data incompatibility between different mapping systems. Furthermore, as indicated above, guidance systems that are based on optical imaging sensors (such as RGB cameras and LIDAR) may have limited functionality when the crop canopy obstructs the ability of the sensors to correctly identify the centre of a crop row. In contrast, advantageously, radar-sensors can be used to image the mass of objects in their field-of-view.

In one or more examples, the controller 514 can determine route-plan-data that is representative of a route to be taken by the agricultural vehicle 530 in the agricultural field, based on the crop-property-data 516. This may be in addition to, or instead of, determining vehicle-control-instructions 528.

The route-plan-data can be representative of a route to be taken by the agricultural vehicle 530, optionally based on the crop-location-data and/or crop-absence-location-data. Such processing can enable a route plan to be adapted in real-time, whilst the agricultural vehicle 530 is in the field. In some examples the controller 514 can determine the route-plan-data by modifying an earlier route plan. For instance, an initial route plan can include a plurality of AB lines that are intended to be representative of the locations of the crop rows. Advantageously, the controller 514 can update that initial route plan based on the crop-radar-data to determine route-plan-data that is more accurate.

As discussed above, a MIMO radar-sensor can be mounted to the agricultural vehicle (such as to its chassis), and the radar-sensor can be positioned with a parallel or transverse field-of-view of the crop rows. Radar reflectivity data is used to track the relative position of the detected row(s) and subsequently request corrections to a navigation system to minimize or reduce cross-track error. This can be by providing vehicle-control-instructions 528 to the agricultural vehicle 530, or by updating route-plan-data that is representative of a route that is to be followed by the agricultural vehicle 530. The radar-sensor 510/controller 514 can communicate at high-speed with a Navigation Controller, for example via a Controller Area Network (CAN bus) and/or Ethernet in order to update route-plan-data or automatically control the agricultural vehicle 530.

In various examples, the crop-property-data can represent one or more of the following parameters:

(a) a desired radius of curvature, to define how sharply the agricultural vehicle 530 should turn in order to be properly aligned with the crop rows. This can be used to set the vehicle-steering-instructions;

(b) cross-track correction (AB line nudge). This can be used to set the route-plan-data.

(c) lateral offsets of detected row(s). This can be used to set the route-plan-data, for example by applying an offset to a plurality of, and optionally all, AB lines that are represented by the route-plan-data. Also, this can be used to set the vehicle-steering-instructions;

(d) direction of travel relative to row(s) (e.g. angle/degrees deviating left/right from the parallel rows). This can be used to set the vehicle-steering-instructions;

Optionally, the controller 214 can determine a property-confidence-value associated with the crop-property-data, and determine the vehicle-control-instructions and/or route-plan-data also based on the property-confidence-value. In this way, a confidence level in the accuracy of the data/signal quality for each of the detected crop row(s) can be taken into account by the controller 214 when determining how, if at all, to set the vehicle-control-instructions and/or route-plan-data. For example, if the vehicle passes through a region of the field with an absence of crop rows or high weed population which degrades the quality of the crop-radar-data such that the crop-property-data is compromised, the property-confidence-value would indicate as such and vehicle navigation would fall back to GPS or operator control. This is an example of a scenario where use of a property-confidence-value can be beneficial. A feature/line/edge/threshold algorithm used to differentiate the rows can include a metric to assess the strength/confidence of the row detection. For instance, for edge detection, artifacts of gradient-based edge detectors, such as spurious responses, can be identified quantitatively via methods such as template matching.

In some examples, any radar-sensor disclosed herein can acquire field-radar-data, which is representative of one or more objects in, and/or characteristics of, an agricultural field. Such objects/characteristics can include ditches, telegraph poles, and boulders, as non-limiting examples. The radar-sensor can acquire the field-radar-data in addition to, or instead of, crop-radar-data. A controller can then process the field-radar-data in order to determine field-property-data that is representative of the presence of any such objects/characteristic that are in the field, in order to apply a collision avoidance safety system for example. In some instances, the controller can determine vehicle-control-instructions based on the field-property-data in order to determine vehicle-speed-instructions for automatically stopping or slowing the agricultural vehicle in advance of the detected object/characteristic. In some examples, the controller can also cause an output-device (such as a display or an audio device) to provide information to an operator of the agricultural vehicle 630 that is representative of the detected object/characteristic. Optionally, the controller can determine vehicle-steering-instructions for automatically steering the agricultural vehicle 630 around the detected object/characteristic of the field.

One or more of the systems described herein can provide a complementary or standalone guidance solution for determining cross-track error by directly sensing the offset of a crop row relative to the vehicle, and requesting corrections to the navigation controller. In particular, systems can be applicable for sprayers to determine a desired offset of the wheel track to the crop rows.

It will be appreciated that any of the control operations disclosed herein, such as setting the speed or direction of travel of the sprayer or an associated tractor, can be performed by comparing data with one or more threshold values, applying an algorithm to data, or using a look-up-table/database to determine a control value based on received/determined data.

What is claimed is:

1. A system, comprising:
    an agricultural vehicle;
    one or more radar-sensors associated with the agricultural vehicle, the one or more radar-sensors configured to acquire crop-radar-data representative of crop rows in an agricultural field, the one or more radar sensors comprising a first radar sensor positioned on the agricultural vehicle such that the first radar sensor has a field of view that is oriented in a forward direction relative to a direction of travel of the agricultural vehicle and that is located entirely below a canopy of the crop rows; and
    a controller configured to determine one or more perimeters of the crop rows that are in the field based at least in part on the crop-radar-data received from the first radar sensor.

2. The system of claim 1, wherein the controller is configured to:
    filter the crop-radar-data by applying one or more filter-coefficient-values to provide filtered-crop-radar-data;
    set the one or more filter-coefficient-values based on one or more crop-parameters; and
    determine the one or more perimeters of the crop rows based on the filtered crop-radar-data.

3. The system of claim 1, wherein the one or more radar-sensors are configured to acquire field-radar-data representative of one or more objects in, and/or characteristics of, an agricultural field; and
    the controller is configured to:
        determine field-property-data based on the field-radar-data; and
        determine route-plan-data and/or vehicle-control-instructions based on: (i) the one or snore perimeters of the crop rows and (ii) the field-property-data.

4. The system of claim 1, wherein the one or more radar-sensors are configured to acquire crop-radar-data that is representative of crop in the agricultural field in the vicinity of the agricultural vehicle.

5. The system of claim 4, wherein the first radar sensor is located at a first-radar position when the field of view of the first radar sensor is entirely below the canopy of the crop rows, the first radar sensor being selectively positionable on the agricultural vehicle at both the first-radar position and a second-radar position, the field of view of the first radar sensor extending from the first radar sensor at a location above the canopy of the crop rows when the first radar is disposed at the second-radar position.

6. The system of claim 1, wherein the one or more perimeters of the crop rows are defined by one or more lateral extremities of a corresponding crop row of the crop rows.

7. The system of claim 1, wherein the controller is further configured to determine a location of the canopy of the crop rows based on the crop-radar-data.

8. The system of claim 7, wherein h controller configured to:
    determine a property-confidence-value associated with the height-centre of the crop rows, and
    determine vehicle-control-instructions based height-centre of the crop rows and the property-confidence-value.

9. The system of claim 7, wherein the controller is configured to:
    filter the crop-radar-data by applying one or more filter-coefficient-values to provide filtered-crop-radar-data;
    set the one or more filter-coefficient-values based on one or more crop-parameters; and
    determine the height-centre of the crop rows based on the filtered crop-radar-data.

10. The system of claim 1, wherein the controller is further configured to determine vehicle-control-instructions for the agricultural vehicle based at least in part on the one or more perimeters of the crop rows.

11. The system of claim 10, wherein the vehicle-control-instructions comprise vehicle-steering-instructions for automatically controlling the direction of travel of the agricultural vehicle.

12. The system of claim 10, wherein the controller is configured to:
    determine a property-confidence-value associated with the one or more perimeters of the crop rows, and
    determine the vehicle-control-instructions also based on the property-confidence-value.

13. The system of claim 10, wherein the vehicle-control-instructions comprise vehicle-speed-instructions for automatically controlling the speed of the agricultural vehicle.

14. The system of claim 10, wherein the vehicle-control-instructions are configured to cause an output-device to provide instructions for an operator of the agricultural vehicle to set a speed and/or direction of travel of the agricultural vehicle.

15. The system of claim 1, wherein the one or more radar sensors further comprise a second radar sensor spaced apart from the first radar sensor, the second radar sensor being positioned on the agricultural vehicle such that the second radar sensor has a field of view that extends from the second radar sensor at a location above the canopy of the crop rows.

16. A system, comprising:
    an agricultural vehicle;
    one or more radar-sensors associated with the agricultural vehicle, the one or more radar-sensors configured to acquire crop-radar-data representative of crop rows in an agricultural field; and
    a controller configured to determine a height-centre of the crop rows based on the crop-radar-data.

* * * * *